US012648578B2

(12) United States Patent
Chang et al.

(10) Patent No.: US 12,648,578 B2
(45) Date of Patent: Jun. 9, 2026

(54) LIPID COMPOSITION FOR BAKERY PRODUCTS

(71) Applicant: CARGILL, INCORPORATED, Wayzata, MN (US)

(72) Inventors: Guifang Chang, Shanghai (CN); Ping Chen, Auckland (NZ); Saiyan Ding, Nantong (CN)

(73) Assignee: Cargill, Incorporated, Wayzata, MN (US)

( * ) Notice: Subject to any disclaimer, the term of this patent is extended or adjusted under 35 U.S.C. 154(b) by 249 days.

(21) Appl. No.: 18/251,752

(22) PCT Filed: Nov. 5, 2021

(86) PCT No.: PCT/US2021/058192
§ 371 (c)(1),
(2) Date: May 4, 2023

(87) PCT Pub. No.: WO2022/098959
PCT Pub. Date: May 12, 2022

(65) Prior Publication Data
US 2024/0298660 A1 Sep. 12, 2024

(30) Foreign Application Priority Data
Nov. 9, 2020 (CN) .......................... 202011239395.2

(51) Int. Cl.
*A23D 7/005* (2006.01)
*A21D 2/16* (2006.01)
*A21D 13/19* (2017.01)

(52) U.S. Cl.
CPC ............. *A23D 7/005* (2013.01); *A21D 2/165* (2013.01); *A21D 13/19* (2017.01)

(58) Field of Classification Search
CPC ...................................................... A23D 7/005
See application file for complete search history.

(56) References Cited

U.S. PATENT DOCUMENTS

| | | | |
|---|---|---|---|
| 2005/0163909 A1 | 7/2005 | Cleenewerck et al. | |
| 2011/0166224 A1 | 7/2011 | Kishore et al. | |

FOREIGN PATENT DOCUMENTS

| | | | |
|---|---|---|---|
| CN | 101756105 A | 6/2010 |
| CN | 103209595 B | 5/2015 |
| CN | 105208872 A | 12/2015 |
| CN | 108566991 A | 9/2018 |
| EP | 0786209 A | 7/1997 |
| JP | 10-001691 A | 1/1998 |
| JP | 2002-253117 A | 9/2002 |
| JP | 2014-036608 A | 2/2014 |
| JP | 6450081 A | 11/2015 |
| JP | 2016-189751 A | 11/2016 |
| JP | 2016-195571 A | 11/2016 |
| JP | 2018-507699 A | 3/2018 |
| JP | 2018-068289 A | 5/2018 |
| JP | 2020-115833 A | 8/2020 |
| JP | 2023-548292 A | 11/2023 |
| WO | 2012/052471 A1 | 4/2012 |
| WO | 2019/208597 A1 | 10/2019 |

OTHER PUBLICATIONS

Miyashita et al. (JP 6450081 B2—Global Dossier Translation of Description) (Year: 2019).*
4th edition Food Ingredients Chart (1998).
Akio Kato, "Application of palm oil and palm kernel oil", Saiwai Shobo, Jul. 31, 1990, 1st Ed., pp. 47.
Bakers Digest: "Typical Fatty Acid Compositions of Selected Edible Fats and Oils", Captial City Products Co, Dec. 18, 1986, 1 page.
Matsumoto et al., "Fatty Acid Composition of micelles formed during in vitro digestion of milk and soybean phospholipids used as additives to milk powder", Kawasaki, Journal of Medical Welfare, vol. 15, No. 1, 2005, pp. 209-216.
Murakami et al., "Effect of Processed Oils and Fats on Cholesterol Metabolism. VII. Effects of Palm Oil, Palm Mid Fraction, and Palm Super Olein", Oleo Science, vol. 43, No. 12, 1994, pp. 1062-1067.
Tetsuo Koyano: "Chocolate crystallography", Journal of the Crystallographic Society of Japan, vol. 56, 2014, pp. 319-322.
Yoshiko Kagawa, "Standard Tables of Food Composition in Japan", 5th Revised and Enlarged Ed 2007, Womon's Nutrition University Press, 1st Ed., first printing, published in Dec. 2006, pp. 388-389.
Youichirou Totani, "Characteristics and applications of fats and Oils", Saiwai Shobo, Jan. 30, 2012, P81.
Basiron et al., "Palm Oil", In: "Bailey's Industrial Oil and Fat Products", 2005, pp. 333-429, XP055713216.
Eleonora et al., "A Novel qNMR Application for the Quantification of Vegetable Oils Used as Adulterants in Essential Oils", Molecules, vol. 26, No. 18, Sep. 7, 2021, p. 5439.

* cited by examiner

*Primary Examiner* — Elizabeth Gwartney

(57) ABSTRACT

A lipid composition includes, by weight of the lipid composition: from 30 wt % to 70 wt % a first lipid component; from 10 wt % to 40 wt % a sweetening substance; from 5 wt % to 20 wt % water; from 0.1 wt % to 1.2 wt % an emulsifier; and 1.5 wt % to 11 wt % a second lipid component. The emulsifier has a SFA content of less than 90 wt %. The second lipid component has a SFA content of at least 90 wt %, and fully saturated fatty acids with a carbon chain of more than 16 carbons account for at least 33.3 wt % of the SFA content of the second lipid component by weight. The molar amount of the second lipid component accounts for from 2.2 mol % to 15 mol % of the total molar amount of the first lipid component, the emulsifier and the second lipid component.

17 Claims, No Drawings

LIPID COMPOSITION FOR BAKERY PRODUCTS

CROSS REFERENCE TO RELATED APPLICATIONS

This application is a national phase application of PCT Application No. PCT/US2021/058192, filed Nov. 5, 2021, which claims the benefit of Chinese Application No. 202011239395.2 filed Nov. 9, 2020, each of which is incorporated by reference herein in its entirety.

FIELD OF THE INVENTION

The present invention generally relates to the technical field of butter substitutes for bakery products.

BACKGROUND OF THE INVENTION

Many popular bakery products are made from laminated doughs. A laminated dough is a dough having a number of thin layers separated by butter. For instance, a galette may have around 27 layers and a croissant may have around 81 layers. The term "laminating" refers to the process of flattening and folding butter into the dough multiple times such that the dough has alternating layers of butter and dough. The butter between the dough layers will melt into the dough layers under heat, thereby producing buttery and flaky thin sheets within the baked goods.

Scientists in the food industry have conducted extensive research on butter substitutes which can produce laminated-dough baked goods with taste and appearance comparable to those made with butter. Pastry margarine is one of the popular butter substitutes widely used in the food industry. Conventional pastry margarine contains 82 wt % fat and no sugar, yet sweetness of bakery products is generally required due to consumer preference. As such, efforts have been made to introduce sugar into pastry margarine, resulting in a reduction in the lipid content therein. The reduction in the lipid content in turn leads to a significant compromise on the textual properties of the pastry margarine.

However, textual properties of pastry margarine are critical to the quality of baked goods. Butter imparts the moist and flaky texture to baked goods. An ideal butter substitute should be capable of replicating the same texture, as the flaky texture is a particularly important feature when it comes to laminated-dough baked goods. Also, an ideal butter substitute should tolerate a broad range of operating temperature and consistently maintain its firmness (hardness) and plasticity despite temperature fluctuations. Such consistent firmness and plasticity can contribute to improved production efficiency of bakery products.

Partially hydrogenated oils (PHOs) used to be added to sweet pastry margarine for the purpose of improving the textual properties thereof. PHOs contain trans fatty acids (TFA). Indeed, an information sheet provided by the World Health Organization entitled "POLICIES TO ELIMINATE INDUSTRIALLY-PRODUCED TRANS FAT CONSUMP-TION" (accessible online via WHO's website at: https://www.who.int/docs/default-source/documents/replace-trans-fats/replace-act-information-sheet.pdf?ua=1) identifies partially hydrogenated oils as the main source of industrially-produced trans fatty acids.

It is known that trans fatty acids raise the low-density lipoprotein (known as the "bad cholesterol") level and lower the high-density lipoprotein (known as the "good cholesterol") level, and thus contribute to higher risks of heart attacks, heart disease, etc. Trans fatty acids have also been associated with the development of type 2 diabetes. Many countries, such as Denmark, have enacted laws and regulations setting limits on the use of trans fatty acids in foods. Some other countries, such as the US and Canada, have gone even further and ban the use of partially hydrogenated oils in foods.

Research has been done using saturated fatty acids (SFA) to replace PHOs. However, a high content of SFA increases the melting point of sweet pastry margarine, which results in a waxy mouthfeel. On the other hand, an excessively low content of SFA is not capable of providing the sweet pastry margarine with the desired textural qualities.

Chinese patent application CN 103209595 A (hereinafter '595 application) discloses a water-in-oil emulsion lipid composition for being folded into a dough, having 35-70% lipid and 0.05-5% adhesive protein based on dry matter. The lipid composition of the '595 application is said to reduce oil leakage and prevent the flaky layers of the baked goods from peeling off. However, the '595 application does not mention improvement on the range of operating temperature of the lipid composition.

Chinese patent application CN 101756105 A (hereinafter '105 application) discloses a healthy sweet and milky emulsion composition for being folded into a dough, comprising 30-70% lipid with a low TFA content, 1-40% milk products and 10-50% sugar The '105 application focuses on improvement of flavor and taste of baked goods, and does not discuss improvement on the range of operating temperature for the emulsion composition.

Chinese patent application CN 108566991 A (hereinafter '991 application) discloses a lipid composition having a low TFA content and good plasticity for the Danish pastry, comprising 40-70% base lipid, 0-2% emulsifier and 30-60% an aqueous phase. The base lipid contains 0-20% palm olein, 0-30% interesterified (IE) lipid 1, 0-30% IE lipid 2 and 10-40% IE lipid 3. The base oil of the IE lipids 1, 2 and 3 includes palm olein, palm stearine, coconut oil and soybean oil. The lipid composition of the '991 application has an operating range of 5-20° C. However, better temperature tolerance is still needed for industrial bakery operations.

In view of the above, there still exists a need for a lipid composition which is capable of providing consistently good firmness and plasticity across a broad range of operating temperature without sacrificing good mouthfeel.

SUMMARY OF THE INVENTION

An aspect of the present invention relates to a lipid composition. The lipid composition includes: from 30 wt % to 70 wt % a first lipid component, from 10 wt % to 40 wt % a sweetening substance, from 5 wt % to 20 wt % water, from 0.1 wt % to 1.2 wt % an emulsifier, and from 1.5 wt % to 11 wt % a second lipid component, by weight of the lipid composition. The emulsifier has a SFA content of less than 90 wt %. The second lipid component has a SFA content of at least 90 wt %, and fully saturated fatty acids with a carbon chain of more than 16 carbons account for at least 33.3 wt % of the SFA content of the second lipid component by weight. The molar amount of the second lipid component accounts for from 2.2 mol % to 15 mol % of the total molar amount of the first lipid component, the emulsifier and the second lipid component. The lipid composition has SFA content of at least 40 wt %, and fully saturated fatty acids with a carbon chain of more than 16 carbons account for at least 12.5 wt % of the SFA content of the lipid composition by weight. The lipid composition provides a hardness of from 200 g to 500 g at 25° C. by texture analysis as measured using a 5 mm cylinder probe to penetrate 75% of original height of the lipid composition at 2 mm/s. The lipid composition contains less than 2% TFA.

Another aspect of the present invention relates to a food product containing a lipid composition according to the present invention. The food product may be a bakery product made from a laminated dough. Specifically, the bakery product may be selected from the group consisting of bread, a croissant, a puff pastry, a Danish pastry and a galette.

A further aspect of the present invention relates to a process of making the lipid composition according to the present invention. The process includes: mixing, by weight of the lipid composition, from 30 wt % to 70 wt % a first lipid component, from 1.5 wt % to 11 wt % a second lipid component and from 0.1 wt % to 1.2 wt % an emulsifier to produce a lipid phase; mixing, by weight of the lipid composition, from 5 wt % to 20 wt % water and from 10 wt % to 40 wt % a sweetening substance to produce an aqueous phase; mixing the lipid phase and the aqueous phase to produce a water-in-oil emulsion; and cooling the water-in-oil emulsion with a cooling apparatus to produce a crystallized emulsion. The emulsifier has a SFA content of less than 90 wt %. The second lipid component has a SFA content of at least 90 wt %, and fully saturated fatty acids with a carbon chain of more than 16 carbons account for at least 33.3 wt % of the SFA content of the second lipid component by weight. The molar amount of the second lipid component accounts for from 2.2 mol % to 15 mol % of the total molar amount of the first lipid component, the emulsifier and the second lipid component. The lipid composition has a SFA content of at least 40 wt %, and fully saturated fatty acids with a carbon chain of more than 16 carbons account for at least 12.5 wt % of the SFA content of the lipid composition by weight. The lipid composition has a hardness of from 200 g to 500 g at 25° C. by texture analysis as measured using a 5 mm cylinder probe to penetrate 75% of original height of the lipid composition at 2 mm/s. The lipid composition contains less than 2% TFA.

A yet further aspect of the present invention relates to a use of the lipid composition according to the present invention for improving a property of a food product. The use includes a method including the step of adding the lipid composition to the food product.

Another aspect of the present invention relates to a method of making a laminated dough using the lipid composition of the present invention, including folding the lipid composition into a flour dough.

Without intending to be limited by theory it is believed that the lipid composition of the present invention provides a butter substitute for pastries with at least one or more benefits selected from a more butter-like texture, providing consistently good firmness, providing consistently good plasticity, improved mouthfeel, etc. Without intending to be bound by theory, it has also been found that the lipid composition of the present invention may impart baked goods with moist and flaky texture, and provide consistently good firmness and plasticity across a broad range of operating temperature. As such, the lipid composition of the present invention is particularly suitable for industrial production of bakery products, such as a bread, a puff pastry, a croissant, a Danish pastry, and/or a galette.

DETAILED DESCRIPTION OF THE INVENTION

Unless otherwise noted, all measurements, weights, lengths, etc. are in metric units, and all temperatures are in degrees Celsius. It is understood that unless otherwise specifically noted, the materials compounds, chemicals, etc. described herein are typically commodity items and/or industry-standard items available from a variety of suppliers and sources worldwide.

As used herein, the expression "Cx:D" refers to the lipid number of a fatty acid, with "x" indicating the length of the fatty acid chain and "D" indicating the number of double bonds. For instance, C18:0 refers to a fully saturated fatty acid having a fatty acid chain of 18 carbons.

As used herein, the term "derivative" refers to a compound derived from a precursor compound by a chemical reaction. For instance, the derivatives of a fatty acid may include, but not limited to, esters, salts, amides, nitriles, halides, anhydrides of the fatty acid.

As used herein, the term "lipid" refers to an oil or fat, derived from various sources including plants, animals and microorganisms.

As used herein, the term "lipid component" refers to a lipid or derivative thereof.

As used herein, the term "melting point" refers to the slip melting point, which is an index of the temperature at which fat softens and becomes sufficiently fluid to slip in an open capillary tube.

As used herein, the term "nutrient enhancer" refers to any substance which provides a lipid composition with additional nutrient value, such as protein, vitamin, mineral, carbohydrate, fat (saturated and unsaturated), dietary fibre, etc.

As used herein, the term "oil" refers to an oil individually or a blend of two or more different oils. By the same token, the term "fat" refers to a fat individually or a blend of two or more fats.

As used herein, the term "interestification" (or "interesterification") refers to a process wherein the fatty acid moieties redistribute over the glycerol moieties in a triglyceride.

As used herein, the term "saturated fatty acid (SFA) content" refers to the ratio of the weight of fully saturated fatty acid moieties in relation to the weight of all fatty acid moieties in a lipid. Likewise, the terms "C18:0 content" and "C22:0 content" refers to the ratio of the weight of C18:0/C22:0 moieties in relation to the weight of all fatty acid moieties in a lipid.

As used herein, the term "solid fat content (SFC)" refers to the ratio of fat in crystalline phase to total fat at a given temperature. The SFC of a lipid composition determines the plasticity thereof to a large extent.

An aspect of the present invention relates to a lipid composition. The lipid composition includes: from 30 wt % to 70 wt % a first lipid component, from 10 wt % to 40 wt % a sweetening substance, from 5 wt % to 20 wt % water, from 0.1 wt % to 1.2 wt % an emulsifier, and from 1.5 wt % to 11 wt % a second lipid component, by weight of the lipid composition. The emulsifier has a SFA content of less than 90 wt %. The second lipid component has a SFA content of at least 90 wt %, and fully saturated fatty acids with a carbon chain of more than 16 carbons account for at least 33.3 wt % of the SFA content of the second lipid composition by weight. The molar amount of the second lipid component accounts for from 2.2 mol % to 15 mol % of the total molar amount of the first lipid component, the emulsifier and the second lipid component. The lipid composition has a SFA content of at least 40 wt %, and fully saturated fatty acids with a carbon chain of more than 16 carbons account for at least 12.5 wt % of the SFA of the lipid composition by weight. The lipid composition provides a hardness of from 200 g to 500 g at 25° C. by texture analysis as measured using a 5 mm cylinder probe to penetrate 75% of original height of the lipid composition at 2 mm/s. The lipid composition contains less than 2% TFA.

Without intending to be bound by theory, it has been found that the lipid composition of the present invention may impart baked goods with moist and flaky texture, and provide consistently good firmness and plasticity across a broad range of operating temperature. As such, the lipid composition of the present invention is particularly suitable for industrial production of bakery products, especially those heavily relying on butter or margarine for texture (e.g., croissants and the Danish pastries). It is believed that the technical effects of the present invention are predicated on the specific SFA content (especially the content of fatty acids with a carbon chain of more than 16 carbons) of the second lipid component and the ratio of the molar amount of the second lipid component in relation to that of the lipid phase of the composition (i.e., the first lipid component, the second lipid component and the emulsifier).

In an aspect of the present invention, the lipid composition contains no partially hydrogenated lipid. As discussed above, partially hydrogenated oils have been identified as the main source of industrially-produced trans fatty acids. As such, by eliminating the use of partially hydrogenated lipid in the composition, the content of TFA can be effectively controlled.

Possible emulsifiers which may be used in the present invention include, but not limited to, sucrose fatty acid esters (or sucrose esters), glycerin fatty acid esters, polyglycerin fatty acid esters, sorbitan fatty acid esters, polyoxyethylene sorbitan fatty acid esters, propylene glycol fatty acid esters, organic acid monoglycerides (e.g., acetic acid monoglycerides, tartaric acid monoglycerides, mixed acetic and tartaric acid esters of monoglycerides, citric acid monoglyceride, diacetyl tartaric acid monoglycerides, lactic acid monoglycerides, succinylated monoglycerides and malic acid monoglycerides), calcium stearoyl lactylate, sodium stearoyl lactylate, lecithin, etc. The emulsifier should have a SFA content of less than 90 wt %; or SFA content of less than 70 wt %; or SFA content of less than 40 wt %.

Without intending to be bound by theory, it is believed that the SFA content and the molar amount of the emulsifier contribute to the desirable textual properties of the lipid composition, such that a broad range of operating temperature is achieved.

In an aspect of the present invention, the lipid composition of the present invention has a SFA content of from 40 wt % to 60 wt %; or SFA content of from 43 wt % to 57 wt %; or SFA content of from 45 wt % to 55 wt %.

Without intending to be bound by theory, it is believed that the specific lipid composition of the present invention strikes a balance between providing butter-like taste and mouthfeel and imparting the lipid composition with desirable textual properties.

In another aspect of the present invention, the lipid composition of the present invention has a C18:0 content of from 4.5 wt % to 9 wt %; or C18:0 content of from 4.7 wt % to 8.5 wtw %; or C18:0 content of from 5 wt % to 8.3 wt %.

In a further aspect of the present invention, the lipid composition of the present invention has a C22:0 content of from 0.1 wt % to 1.5 wt %; or C22:0 content of from 0.3 wt % to 1.3 wt %; or C22:0 of from 0.4 wt % to 1.1 wt %.

Without intending to be bound by theory, it is believed that the SFA content (especially the C18:0 content or the content of fully saturated fatty acids with longer carbon chain) contributes to the temperature-tolerance of the lipid composition of the present invention in terms of the firmness and plasticity of the composition.

In an aspect of the present invention, the sweetening substance is selected from the group consisting of a sugar, a sugar substitute, high-intense sweeteners and a combination of two or more thereof. It may be selected from the group consisting of acesulfame potassium, alitame, aspartame, cyclamate, saccharin, sucralose, thaumatin, neotame, stevia, stevia derivatives, glucose, sucrose, fructose, isomalt, lactitol, mannitol, maltitol, xylitol, sorbitol, maltodextrin, polydextrose, and a combination of two or more thereof. A person skilled in the art will appreciate that the addition of sweetening substance and the specific selection thereof can be determined based on actual needs. For instance, for a bakery product targeting health-conscious consumers, a skilled person may determine to not add any high-calorie sweetener at all, or to add sweeteners derived from a specific natural source only.

In an aspect of the present invention, the lipid composition includes at least 1 wt % fully saturated fatty acids with a carbon chain longer than 16 carbons derived from the second lipid component; or at least 1.5 wt % fully saturated fatty acids with a carbon chain longer than 16 carbons derived from the second lipid component; or at least 2 wt % fully saturated fatty acids with a carbon chain longer than 16 carbons derived from the second lipid component.

In an aspect of the present invention, the content of the first lipid component is from 40 wt % to 60 wt %; or from 45 wt % to 60 wt %, by weight of the lipid composition. In another aspect of the present invention, the content of the second lipid component in the lipid composition of the present invention is from 1.5 wt % to 10 wt %; or from 1.5 wt % to 7 wt %, by weight of the lipid composition.

Without intending to be bound by theory, it is believed that the specific SFA content and the ration between the molar amount of the second lipid component and the total molar amount of the lipid phase and the content of the second lipid component in the lipid composition contribute to the consistently good firmness and plasticity thereof across a broad temperature range.

In an aspect of the present invention, the lipid composition of the present invention has a hardness of from 200 g to 500 g; or from 230 g to 450 g; or from 340 g to 400 g, at 25° C. by texture analysis as measured using a 5 mm cylinder probe to penetrate 75% of original height of the lipid composition at 2 mm/s. In another aspect of the present invention, the lipid composition of the present invention has a hardness of from 800 g to 1800 g; or from 900 g to 1500 g, at 5° C. by texture analysis as measured using a 5 mm cylinder probe to penetrate 75% of original height of the lipid composition at 2 mm/s. Without intending to be bound by theory, it is believed that the desirable hardness/firmness of the lipid composition of the present invention is directly related to the SFA content of the second lipid component in the composition and the ratio of the molar amount of the second lipid component in relation to that of the lipid phase. As such, desirable hardness across a broad range of 5-25° C. is achieved. In other words, the lipid composition of the present invention is suitable for use across the range of 5-25° C. Such a broad range of operating temperature may make bakery production less susceptible to temperature fluctuations, and thus can contribute to improved production efficiency of bakery products.

In an aspect of the present invention, the first lipid component is selected from the group consisting of an oil derived from a plant source, a fat derived from a plant source, an oil derived from an animal source, a fat derived from an animal source, and an oil derived from a microorganism source, a fat derived from a microorganism source and a combination of two or more thereof.

In an aspect of the present invention, the oil and/or fat derived from a plant source may be selected from the group consisting of coconut oil, corn oil, canola oil, cottonseed oil, olive oil, palm oil, peanut oil, rapeseed oil, safflower oil, sesame oil, soybean oil, sunflower oil, almond oil, beech nut oil, brazil nut oil, cashew oil, hazelnut oil, macadamia oil, mongongo nut oil, pecan oil, pine oil, pistachio oil, walnut oil, pumpkin seed oil, grapefruit seed oil, lemon oil, orange oil, bitter gourd oil, bottle gourd oil, buffalo gourd oil, butternut squash seed oil, egusi seed oil, watermelon seed oil, acai oil, black seed oil, blackcurrant seed oil, borage seed oil, evening primrose oil, flaxseed oil, amaranth oil, apricot oil, apple seed oil, argan oil, avocado oil, babassu oil, ben oil, borneo tallow nut oil, cape chestnut oil, carob pod oil, cocklebur oil, cohune oil, coriander seed oil, date seed oil, dika oil, false flax oil, grape seed oil, kapok seed oil, kenaf seed oil, lallemantia oil, mafura oil, marula oil, meadowfoam seed oil, mustard oil, niger seed oil, nutmeg butter, okra seed oil, papaya seed oil, perilla seed oil, persimmon seed oil, pequi oil, pili nut oil, pomegranate seed oil, poppyseed oil, pracaxi oil, virgin pracaxi oil, prune kernel oil, quinoa oil, ramtil oil, rice bran oil, royle oil, sacha inchi oil, sapote oil, seje oil, shea butter, taramira oil, tea seed oil, thistle oil, tigernut oil, tobacco seed oil, tomato seed oil, wheat germ oil and a combination of two or more thereof.

In an aspect of the present invention, the oil and/or fat derived from an animal source may be selected from the group consisting of oil or fat derived from a pig, a chicken, a cow, a duck, a goose, cheese, butter, milk and a combination of two or more thereof. A person skilled in the art will understand that the addition or omission of an oil and/or fat derived from an animal source may be determined based on, for instance, the target consumer group of the bakery product using the lipid composition of the present invention. In the case of a bakery product developed for vegan consumers, such oil and/or fat should be avoided.

In an aspect of the present invention, the oil and/or fat derived from a microorganism source may be selected from oil and/or fat produced by a bacteria, a yeast, a fungus, an algae, and a combination of two or more thereof. For instance, oils produced by *Mortierella alpina, Cryptheco-dinium cohnii* and *Schizochytrium* spp may be used.

In an aspect of the present invention, the first lipid composition is an oil selected from the group consisting of soy bean oil, palm olein, palm stearin, palm kernel oil, palm oil, sunflower oil, canola oil, coconut oil and a combination of two or more thereof. In a specific aspect of the present invention, the first lipid component is an oil selected from the group consisting of soy bean oil, palm olein, palm stearin, palm kernel oil and a combination of two or more thereof. The oil may optionally be processed by a technique selected from the group consisting of fractionation, interes-tification, blending and a combination of two or more thereof. In a specific example, the first lipid component is a combination of soy bean oil, palm olein, palm stearin and palm kernel oil. A person skilled in the art should understand that palm olein, palm stearin and palm kernel oil may be replaced with palm oil, from which these oils are derived.

In an aspect of the present invention, the first lipid component has a SFA content of from 35 wt % to 60 wt %; or from 40 wt % to 55 wt %. In another aspect of the present invention, the first lipid component has a C18:0 content of from 3 wt % to 5 wt %; or from 3.3 wt % to 4.7 wt %.

Without intending to be bound by theory, the inventors of the present application have discovered that, an oil or oil combination may be used as the first lipid component in the present invention, to the extent that the specific SFA content and the average molecular weight of the first lipid component required by the present invention is met. As such, a person skilled in the art should understand that, whilst the present application only mentions a few specific combinations of oils derived from a plant source, other combinations of oils derived from various sources fulfilling the specific SFA content and average molecular weight set forth in the present application would also fall within the scope of the present invention.

In an aspect of the present invention, the lipid composition may further include an additive. The additive may be selected from the group consisting of calcium carbonate, acetic acid, potassium acetate, sodium acetate, calcium acetate, lactic acid, carbon dioxide, malic acid, ascorbic acid, sodium ascorbate, calcium ascorbate, a fatty acid ester of ascorbic acid, tocopherol-rich extract, alpha-tocopherol, gamma-tocopherol, delta-tocopherol, lecithin, sodium lac-tate, potassium lactate, calcium lactate, citric acid, sodium citrate, potassium citrate, calcium citrate, tartaric acid, sodium tartrate, potassium tartrate, sodium potassium tar-trate, sodium malate, potassium malate, calcium malate, calcium tartrate, triammonium citrate, alginic acid, sodium alginate, potassium alginate, ammonium alginate, calcium alginate, agar, carrageenan, processed euchema seaweed, locust bean gum, guar gum, tragacanth, gum Arabic, xanthan gum, tara gum, gellan gum, sorbitol, mannitol, glycerol, konjac, pectin, cellulose, methyl cellulose, ethyl cellulose, hydroxypropyl cellulose, hydroxpropyl methyl cellulose, ethyl methyl cellulose, sodium carboxy methyl cellulose and cellulose gum, enzymatically hydrolysed carboxy methyl cellulose and cellulose gum, sodium/potassium/calcium salt of a fatty acid, magnesium salt of a fatty acid, an acetic acid ester of mono- and diglyceride of fatty acids, a lactic acid ester of mono- and diglyceride of fatty acids, a citric ester of mono- and diglyceride of fatty acids, a tartaric acid ester of mono- and diglyceride of fatty acids, mono and diacetyl tartaric acid ester of mono- and diglyceride of fatty acids, mixed acetic and tartaric acid ester of mono- and diglyceride of fatty acids, sodium carbonate, potassium carbonate, ammonium carbonate, magnesium carbonate, hydrochloric acid, potassium chloride, calcium chloride, magnesium chloride, sulphuric acid, sodium sulphate, potassium sul-phate, calcium sulphate, sodium hydroxide, potassium hydroxide, calcium hydroxide, ammonium hydroxide, mag-nesium hydroxide, calcium oxide, magnesium oxide, fatty acid, gluconic acid, glucono-delta-lactone, sodium glucon-ate, potassium gluconate, calcium gluconate, glutamic acid, monosodium glutamate, monopotassium glutamate, magne-sium diglutamate, guanylic acid, disodium guanylate, dipo-tassium guanylate, calcium guanylate, inosinic acid, diso-dium inosinate, dipotassium inosinate, calcium inosinate, calcium 5'-ribonucleotides, disodium 5'-ribonucleotides, glycine and sodium salt thereof, L-cysteine, argon, helium, nitrogen, nitrous oxide, oxygen, hydrogen, isomalt, maltitol, lactitol, xylitol, erythritol, invertase, polydextrose, oxidized starch, monostarch phosphate, distarch phosphate, phos-phate distarch phosphate, acetylated distarch phosphate, acetylated starch, acetylated distarch adipate, hydroxy pro-pyl starch, hydroxyl propyl distarch phosphate, starch sodium octenyl succinate, acetylated oxidized starch, sorbic acid, potassium sorbate, sodium nitrate, potassium nitrate, phosphoric acid, sodium phosphate, potassium phosphate, calcium phosphate, magnesium phosphate, a diphosphate, a triphosphate, a polyphosphate, propionic acid, sodium propionate, calcium propionate, potassium propionate, polyoxyethylene sorbitan monolaurate (polysorbate 20), polyoxyethylene sorbitan monooleate (polysorbate 80), polyoxyethylene sorbitan monopalmitate (polysorbate 40), polyoxyethylene sorbitan monostearate (polysorbate 60), polyoxyethylene sorbitan tristearate (polysorbate 65), a sucrose ester of a fatty acid, a sucroglyceride, a polyglycerol ester of a fatty acid, a propane-1,2-diol ester of a fatty acid, sodium stearoyl-2-lactylate, calcium stearoyl-2-lactylate, sorbitan monostearate, sorbitan tristearate, sorbitan monolaurate, sorbitan monooleate, sorbitan monopalmitate, silicon dioxide, calcium silicate, magnesium silicate and talc, a riboflavin, chlorophyl, chlorophyllin, a copper complex of chlorophyl, a copper complex of chlorophyllin, plain caramel, caustic sulphite caramel, ammonia caramel, sulphite ammonia caramel, vegetable carbon, carotene, paprika extract, capsanthin, capsorubin, beetroot red, betanin, anthocyanin, titanium dioxide, iron oxide, a hydroxide and a combination of two or more thereof.

In a further aspect of the present invention, the additive is selected from the group consisting of an antioxidant, a nutrient enhancer, a flavoring substance, a preservative, a pigment and a combination of two or more thereof.

In an aspect of the present invention, the nutrient enhancer provides the lipid composition with additional nutrient value selected from the group consisting of protein, carbohydrate, vitamin, mineral, fat (saturated and unsaturated) and a combination of two or more thereof.

In aspect of the present invention, the preservative is a natural preservative. For instance, the natural preserve may be a plant extract (e.g., rosemary extract, oregano extract, hops extract, forthysia extract, perilla leaves extract), tea polyphenols, salt, sugar, vinegar, alcohol, citric acid, diatomaceous earth, allicin, protamine, propolis or extract thereof, chitosan, clove oil, castor oil and a combination of two or more thereof. In another aspect of the present invention, the preservative is an artificial preservative. For instance, the artificial preservative may be a benzonate, a nitrite, a sulphate, a phenol derivative, a glycerol derivative and a combination of two or more thereof. A person skilled in the art would understand that the specific selection of a preservative may be based on factors such as cost, target consumers of the end product, health benefit, solubility, flavor, etc.

In an aspect of the present invention, the flavoring substance is selected from the group consisting of a vanilla extract, vanillin, a banana flavoring oil, a banana flavoring extract, an almond flavoring oil, an almond flavoring extract, a coconut flavoring oil, a coconut flavoring extract, a coffee flavoring oil, a coffee flavoring extract, a hazelnut flavoring oil, a hazelnut flavoring extract, a cinnamon flavoring oil, a cinnamon flavoring extract, a tea flavoring oil, a tea flavoring extract, a pecan flavoring oil, a pecan flavoring extract, a caramel flavoring oil, a caramel flavoring extract, a turmeric flavoring oil, a turmeric flavoring extract, a soy flavoring oil, a soy flavoring extract, and a combination of two or more thereof. In another aspect of the present invention, the flavoring substance imparts the lipid composition with butter-like taste, and may include milk powder, cream or other dairy products. A person skilled in the art should understand that in certain situations exclusion of dairy products may be preferable, for instance, for consumers with lactose intolerance.

In an aspect of the present invention, the pigment is selected from the group consisting of titanium dioxide, calcium carbonate, a carotenoid and derivative thereof, a retinol and derivative thereof, and a riboflavin and derivative thereof. A person skilled in the art will appreciate that certain types of food pigments may carry additional health benefits other than providing the lipid composition with a desirable color. For instance, carotenoids are known to potentially boost the immune system and have inflammatory properties. Also, a skilled person should understand that the pigments listed herein is not an exhaustive list; the use of a specific pigment may be determined by a skilled person based on one or more factors such as the desired color, its health benefit and food regulation of a specific jurisdiction etc.

In a further specific aspect of the present invention, the pigment is beta-carotene.

In an aspect of the present invention, the antioxidant may be a carotenoid, which is discussed above. Suitable antioxidants may also include a retinol (e.g., vitamin A) and/or a riboflavis (e.g., vitamin B). Other possible antioxidants may be selected from the group consisting of tertiary butylhydroquinone, a tea polyphenol, berberine, silymarin, a flavonoid, a flavonoid derivative, ascorbic acid (e.g., vitamin C), an ascorbic acid derivative, retinol (e.g., vitamin A), a retinol derivative, a butylated hydroxyanisole, a butylated hydroxytoluene, propyl gallate, guaiac resin, isopropyl citrate, stannous chloride, thiodipropionate (e.g., dilauryl thiodipropionate) and a combination of two or more thereof. The antioxidant may also have beneficial health effects, such as boosting the immune system, etc.

In an aspect of the present invention, the molar amount of the second lipid component accounts for from 2.2 mol % to 15 mol %; or from 2.5 mol % to 13.5 mol %; or from 2.55 mol % to 13.2 mol %; or from 2.7 mol % to 13 mol %; or from 5.2 mol % to 12.95 mol % of the total molar amount of the first lipid component, the emulsifier and the second lipid component. In another aspect of the present invention, the average molecular weight of the second lipid component is from 400 g/mol to 1650 g/mol; or from 500 g/mol to 1400 g/mol; or from 550 g/mol to 1300 g/mol; or from 600 g/mol to 1250 g/mol. In a yet further aspect of the present invention, the average molecular weight of the first lipid component, the emulsifier and the second lipid component is from 700 g/mol to 900 g/mol; or from 750 g/mol to 850 g/mol; or from 780 g/mol to 835 g/mol. Without intending to be bound by theory, it is believed that a balance is to be struck between the average molecular weight of the second lipid component and its content in the composition, such that the molar amount of the second lipid component accounts for from 2.2 mol % to 15 mol % of the total molar amount of the first lipid component, second lipoid component and emulsifier. Such a balance helps contribute to the desirable hardness of the lipid composition across a broad temperature range.

In an aspect of the present invention, the average molecular weight of the first lipid component may be from 600 g/mol to 1000 g/mol; or from 700 g/mol to 900 g/mol; or from 750 g/mol to 850 g/mol. In another aspect of the present invention, the average molecular weight of the emulsifier may be 600 g/mol to 1300 g/mol; or from 700 g/mol to 1200 g/mol; or from 800 g/mol to 1100 g/mol. Without intending to be bound by theory, it is believed that the average molecular weight of the first lipid component and/or the emulsifier and the content thereof in the lipid composition also helps contribute to the desirable hardness of the lipid composition across a broad temperature range.

In an aspect of the present invention, the emulsifier may be from 0.2 wt % to 1 wt %; or from 0.4 wt % to 0.6 wt %, by weight of the lipid composition. Without intending to be bound by theory, it is believed that the specific amount of the emulsifier used in the lipid composition is at least partly related to the average molecular weight of the emulsifier.

Another aspect of the present invention relates to a food product containing a lipid composition according to the present invention. More specifically, the present invention relates to a food product comprising the lipid composition of the present invention and at least one other nutrient, which is not a lipid or a lipid composition. The at least one other nutrient is selected from the group consisting of proteins, carbohydrates, vitamins, minerals and water. The specific amounts of at least one other nutrient in the food composition is adjusted based on the type of the food composition. The food product may be a bakery product. Preferably the bakery product has a laminated structure. Typically the bakery products may be made from a laminated dough. Specifically, the bakery product may be selected from the group consisting of a bread, a croissant, a puff pastry, a Danish pastry and a galette. The bread may, for instance, be a hand-torn bread, a toast bread or an enriched white bread.

Without intending to be bound by theory, the bakery product using the lipid composition of the present invention has the desired moist and flaky texture without the use of butter. Also, the lipid composition of the present invention has consistently good firmness and plasticity across a broad range of operating temperature, and is thus particularly suitable for industrial production of bakery products.

A further aspect of the present invention relates to a process of making a lipid composition according to the present invention. The process includes: mixing from 30 wt % to 70 wt % a first lipid component, from 1.5 wt % to 11 wt % a second lipid component and from 0.1 wt % to 1.2 wt % an emulsifier to produce a lipid phase; mixing, by weight of the lipid composition, from 5 wt % to 20 wt % water and from 10 wt % to 40 wt % a sweetening substance to produce an aqueous phase; mixing the lipid phase and the aqueous phase to produce a water-in-oil emulsion; and cooling the water-in-oil emulsion with a cooling apparatus to produce a crystallized emulsion (i.e., the lipid composition). The emulsifier has a SFA content of less than 90 wt %. The second lipid component has a SFA content of at least 90%, and fully saturated fatty acids with a carbon chain of more than 16 carbons accounts for at least 33.3 wt % the SFA of the second lipid component. The molar amount of the second lipid component accounts for from 2.2 mol % to 15 mol % of the total molar amount of the first lipid component, the emulsifier and the second lipid component. The lipid composition has a SFA of at least 40 wt %, and fully saturated fatty acids with a carbon chain of more than 16 carbons accounts for at least 12.5 wt % of the SFA of the lipid composition. The lipid composition has a hardness of from 200 g to 500 g at 25° C. by texture analysis as measured using a 5 mm cylinder probe to penetrate 75% of original height of the lipid composition at 2 mm/s. The lipid composition contains less than 2% TFA.

In an aspect of the present invention, the process further includes adding a lipophilic additive to the lipid phase before mixing with the aqueous phase. The lipophilic additive may be selected from the group consisting of a lipophilic antioxidant, a lipophilic nutrient enhancer, a lipophilic flavoring substance, a lipophilic preservative, a lipophilic pigment and a combination of two or more thereof. In a specific example, the lipophilic additive is a lipophilic antioxidant. In another aspect of the present invention, the process further includes adding a water-soluble additive to the aqueous phase before mixing with the lipid phase. The water-soluble additive may be selected from the group consisting of a water-soluble antioxidant, a water-soluble nutrient enhancer, a water-soluble flavoring substance, a water-soluble preservative, a water-soluble pigment and a combination of two or more thereof.

The addition of the antioxidant prevents oxidation of the lipid composition, thereby extending the shelf life thereof. Further, as noted above, some antioxidant carries additional health benefits, and the addition thereof may thus add to the appeal of the lipid composition of the present invention or a food product using the same to health-conscious consumers. The nutrient enhancer may provide the lipid composition with additional nutrient value to appeal to the desires of health-conscious consumers. Flavoring substance and/or pigment may be added to the lipid composition, for the purpose of improving the appearance thereof.

In a further aspect of the present invention, the process further includes the step of subjecting the crystallized emulsion to one or more of: resting, extrusion, and tempering. Without intending to be bound by theory, resting allows the crystal network of fats to sufficiently develop prior to any subsequent processing. Through extrusion, the lipid composition of the present invention may be made into various shapes, depending on the specific bakery products to which the composition is to be applied. For instance, for a bakery product made of a laminated dough, a lipid composition in sheets may be particularly suitable. Without intending to be bound by theory, it is believed that the tempering process has an impact on the crystal form of fats, which in turn affects the textual properties (e.g., hardness) thereof. As such, a suitable tempering process may improve the textual properties of the lipid composition of the present invention.

A yet further aspect of the present invention relates to a use of the lipid composition according to the present invention for improving a property of a food product. The use includes adding the lipid composition of the present invention to the food product. As discussed above, the lipid composition can deliver desirable textual properties while providing butter-like taste and mouthfeel. Further, as discussed above, the lipid composition may contain one or more additives that provide additional nutritional value and/or health benefits. In a specific example, the lipid composition of the present invention may improve one or more of the following properties of the food product to which it is added: nutritional profile, texture, color, taste, aroma and appearance.

In an aspect of the present invention, the food product the property of which is improved by the lipid composition of the present invention is selected from the group consisting of a bread, a croissant, a puff pastry, a Danish pastry and a galette. In another aspect of the present invention, the lipid composition of the present invention is added to the food product as a laminating fat. For instance, the lipid composition may be rolled and folded into dough layers to make a laminated dough.

Another aspect of the present invention relates to a method of making a laminated dough using the lipid composition of the present invention, including folding the lipid composition into a flour dough. In an aspect of the present invention, the method further includes a step of subjecting flour dough incorporating the lipid composition to a process consisting of the group of rolling, folding, sheeting and a combination of two or more thereof. This method is particularly useful for making bakery products, especially those made of laminated doughs.

Illustrative Examples

The following examples are conducted to explore the technical effects of various ingredients and the content thereof in the lipid composition of the present invention.

In all examples, first lipid components 1 and 2 are a blend of the following oils, followed by chemical interesterification.

| First Lipid Component | Ingredient/wt % | | | |
| --- | --- | --- | --- | --- |
| | Soy Bean Oil | Palm Olein | Palm Stearin | Palm Kernel Oil |
| 1 | 12.5% | 76% | 11% | 0.5% |
| 2 | 11% | 56% | 21% | 12% |

The first lipid components, emulsifiers and second lipid components have the following SFA content and average molecular weight.

| Ingredient | Total SFA Content/ wt % | C18:0/ wt % | C22:0/ wt % | Average Molecular Weight/g/mol |
| --- | --- | --- | --- | --- |
| First Lipid Component 1 | 44.0% 44.7% | 4.5% 4.4% | 0.0% 0.1% | 815 |
| First Lipid Component 2 | 51.6% | 3.5% 4.3% | 0.0% | 795 |
| Emulsifier 1 | 25.3% 27.2% | 4.1% | 0.5% | 1075 |
| Emulsifier 2 | 32.0% | 13.6% | 0.4% | 825 |
| Second Lipid Component 1 | 99.5% | 37.4% | 27.7% | 823 |
| Second Lipid Component 2 | 99.4% 99.6% | 42.2% | 40.3% | 1278 |
| Second Lipid Component 3 | 99.7% | 38.0% | 0.1% | 1177 |
| Second Lipid Component 4 | 99.7% | 37.4% | 0.0% | 570 |
| Second Lipid Component 5 | 99.9% 98.7% | 39.1% | 0.1% | 845 |

The fatty acid composition is determined from their methyl esters by gas liquid chromatograph-mass spectrometry in accordance with ISO 15304 (ISO, 2002). The SFC is determined based on NMR results, according to the AOCS Cd16/81 (Firestone, 1989) at 40° C. The melting point is determined according to AOCS Cc 3-25. The average molecular weight of the lipid components and the emulsifiers is determined by gel permeation chromatography.

The hardness of the lipid compositions is determined by measuring "work of penetration" and "adhesiveness" (penetration tests) at 5° C. and 25° C. respectively, using a Texture Analyzer. A 5 mm cylinder probe is used to penetrate sample lipid compositions to 75% of their original height at 2 mm/s.

The lipid compositions tested in the following examples are made by a process commonly used for producing water-in-oil emulsions. Specifically, the first lipid component(s), second lipid component(s), emulsifier(s) and optionally antioxidant(s) are added into a lipid phase tank. Heat is applied such that the lipid phase ingredients melt. The lipid phase ingredients are vigorously stirred and mixed, forming the lipid phase. The lipid phase is then pumped into the emulsion tank and is continuously stirred at a temperature of 50-70° C. Water, sweetening substance, and optionally milk powder and salt for flavoring, are added to the aqueous phase tank and are heated and stirred at a temperature of 50-60° C. until the solid ingredients dissolve, forming the aqueous phase. The aqueous phase is subsequently pumped into the emulsion tank to mix with the lipid phase under stirring at a temperature of 50-60° C., affording a water-in-oil emulsion. In this example, salt is also used as a natural preservative. Optionally, additional flavoring substance, antioxidant, nutrient enhancer, preservative and/or pigment may be added to the emulsion or the individual lipid/aqueous phase.

The emulsion is subject to a plate heat exchanger at a temperature of 65-85° C. for 10-40 minutes for sterilization, and then cooled to 50-60° C. The emulsion is then pumped into a cooling apparatus such as a scraped surface heat exchanger by Kombinator®, Votator® or Prefector® for crystallization. The crystallized emulsion is subject to a resting tube, followed by extrusion as sheet or strip at 10-30° C. The extruded sheets or strips are packaged and tempered for 1-5 days, and stored at a temperature of 0-10° C.

Whilst the present application only describes one production process, a person skilled in the art should understand that any production process suitable for producing water-in-oil emulsions may be used to produce the lipid composition of the present invention.

Example 1

In this example, the effect of the content of the second lipid components on the melting point of the lipid phase of the composition is tested. The experimental results are summarized below.

| Ingredient | Batch | | | | | | |
| --- | --- | --- | --- | --- | --- | --- | --- |
| | M1 | M2 | M3 | M4 | M5 | M6 | M7 |
| First Lipid Component 1 | 97.54 wt % | 95.67 wt % | 93.87 wt % | 92.14 wt % | 90.48 wt % | 88.86 wt % | 87.32 wt % |

-continued

| | Batch | | | | | | |
|---|---|---|---|---|---|---|---|
| Ingredient | M1 | M2 | M3 | M4 | M5 | M6 | M7 |
| Emulsifier 1 | 0.82 wt % | 0.81 wt % | 0.79 wt % | 0.78 wt % | 0.76 wt % | 0.75 wt % | 0.74 wt % |
| Second Lipid Component 1 | 1.64 wt % | 1.61 wt % | 1.58 wt % | 1.55 wt % | 1.52 wt % | 1.5 wt % | 1.47 wt % |
| Second Lipid Component 4 | N/A | 1.91 wt % | 3.76 wt % | 5.53 wt % | 7.24 wt % | 8.89 wt % | 10.47 wt % |
| SFA content of lipid phase | 45.5 wt % | 46.3 wt % | 47.1 wt % | 47.9 wt % | 48.6 wt % | 49.4 wt % | 50.0 wt % |
| C18:0 content of lipid phase | 4.9 wt % | 5.4 wt % | 6.0 wt % | 6.5 wt % | 6.9 wt % | 7.5 wt % | 7.9 wt % |
| C22:0 content of lipid phase | 0.5 wt % | 0.5 wt % | 0.5 wt % | 0.5 wt % | 0.5 wt % | 0.5 wt % | 0.5 wt % |
| SFC of lipid phase at 40° C. | 5.2 wt % | 4.1 wt % | 5.7 wt % | 7.3 wt % | 8.9 wt % | 10.8 wt % | 12.9 wt % |
| TFA content of lipid phase | 1.2 wt % | 1.2 wt % | 1.2 wt % | 1.1 wt % | 1.1 wt % | 1.1 wt % | 1.0 wt % |
| Melting point of lipid phase | 40.4° C. | 40.6° C. | 41.7° C. | 42.7° C. | 43° C. | 44.1° C. | 48.1° C. |

It can be seen from the above that where the content of the second lipid component(s) is higher than 11 wt %, the melting point of the lipid phase is higher than 48° C. Also, the SFC of the lipid phase of such an example at 40° C. is higher than 12 wt %, which is not beneficial to producing a good mouthfeel when the lipid phase is used in baked goods such as a Danish pastry. This is because, as noted above, firm to work with. Also, it is expected that the lipid composition would have a waxy mouthfeel.

Example 2

In this example, the effect of the content of the second lipid component on the melting point of the lipid phase of the composition is tested.

| | Batch | | | | | | |
|---|---|---|---|---|---|---|---|
| Ingredient | H1 | H2 | H3 | H4 | H5 | H6 | H7 |
| First Lipid Component 1 | 97.54 wt % | 95.67 wt % | 93.87 wt % | 92.14 wt % | 90.48 wt % | 88.86 wt % | 87.32 wt % |
| Emulsifier 1 | 0.82 wt % | 0.81 wt % | 0.79 wt % | 0.78 wt % | 0.76 wt % | 0.75 wt % | 0.74 wt % |
| Second Lipid Component 1 | 1.64 wt % | 1.61 wt % | 1.58 wt % | 1.55 wt % | 1.52 wt % | 1.5 wt % | 1.47 wt % |
| Second Lipid Component 4 | N/A | N/A | N/A | N/A | N/A | N/A | N/A |
| Second Lipid Component 5 | N/A | 1.91 wt % | 3.76 wt % | 5.53 wt % | 7.24 wt % | 8.89 wt % | 10.47 wt % |
| SFA content of lipid phase | 45.5 wt % | 46.8 wt % | 47.6 wt % | 48.4 wt % | 49.3 wt % | 50.3 wt % | 51.1 wt % |
| C18:0 content of lipid phase | 4.9 wt % | 5.8 wt % | 6.2 wt % | 6.8 wt % | 7.4 wt % | 7.9 wt % | 8.4 wt % |
| C22:0 content of lipid phase | 0.6 wt % | 0.6 wt % | 0.6 wt % | 0.6 wt % | 0.6 wt % | 0.6 wt % | 0.6 wt % |
| SFC of lipid phase at 40° C. | 5.0 wt % | 5.6 wt % | 7.1 wt % | 8.4 wt % | 9.9 wt % | 11.2 wt % | 12.6 wt % |
| TFA content of lipid phase | 1.2 wt % | 1.2 wt % | 1.1 wt % | 1.1 wt % | 1.1 wt % | 1.1 wt % | 1.1 wt % |
| Melting point of lipid phase | 40.5° C. | 41.1° C. | 42.6° C. | 43.7°C | 45.0° C. | 46.0° C. | 46.8° C. |

SFC relates to the plasticity of a lipid. As such, with the SFC being too high, the lipid composition is expected to be too It can be seen from the above that, where the content of second lipid components is higher than 11 wt %, the melting point of the lipid phase is higher than 46° C. Once again, the SFC of the lipid phase in such an example at 40° C. is higher than 12 wt %, which is not beneficial to providing a good mouthfeel for baked goods. As discussed above, a high SFC is also expected to compromise the operability of the lipid composition.

Example 3

In this example, the effect of the content of the second lipid components on the hardness of the lipid composition is explored.

| | Batch | | | |
|---|---|---|---|---|
| Ingredient | FO1 | FO2 | FO3 | FO4 |
| First Lipid Component 1 | 51.87 wt % | 52.37 wt % | 59.37 wt % | 59.37 wt % |
| Water | 9 wt % | 9 wt % | 15 wt % | 15 wt % |
| Sugar | 20 wt % | 20 wt % | 24 wt % | 24 wt % |
| Fructose syrup | 17 wt % | 17 wt % | 0 wt % | 0 wt % |
| Emulsifier 1 | 0.4 wt % | 0.5 wt % | 0.5 wt % | 0.5 wt % |
| Emulsifier 2 | 0.8 wt % | N/A | N/A | N/A |
| Second Lipid Component 1 | N/A | 1 wt % | 1 wt % | N/A |
| Second Lipid Component 2 | N/A | N/A | N/A | 1 wt % |
| Second Lipid Component 3 | N/A | N/A | N/A | N/A |
| Second Lipid Component 4 | 0.8 wt % | N/A | N/A | N/A |
| Antioxidant | 0.005 wt % | 0.005 wt % | 0.005 wt % | 0.005 wt % |
| Flavor | 0.12 wt % | 0.12 wt % | 0.12 wt % | 0.12 wt % |
| Beta-carotene | 0.0045 wt % | 0.0045 wt % | 0.0045 wt % | 0.0045 wt % |
| SFA Content of Lipid Phase | 44.9 wt % | 45.1 wt % | 44.9 wt % | 45.3 wt % |
| C18:0 Content of Lipid Phase | 4.8 wt % | 4.9 wt % | 4.8 wt % | 4.9 wt % |
| C22:0 Content of Lipid Phase | 0.1 wt % | 0.6 wt % | 0.5 wt % | 0.8 wt % |
| Second Lipid Component Content of Lipid Composition | 0.80 wt % | 1.00 wt % | 1.00 wt % | 1.00 wt % |
| Molar Amount of Second Lipid Component/Molar Amount of Lipid Phase | 2.11 mol % | 1.84 mol % | 1.63 mol % | 1.06 mol % |
| TFA Content of Lipid Phase | 1.16 wt % | 1.18 wt % | 1.17 wt % | 1.33 wt % |
| Hardness of Lipid Composition at 5° C. by TA analysis | 832 g | 1039 g | 813 g | 560 g |
| Hardness of Lipid Composition at 25° C. by TA analysis | 128 g (Too soft) | 183 g (Too soft) | 100 g (Too soft) | 134 g (Too soft) |

| | Batch | | |
|---|---|---|---|
| Ingredient | FT1 | FT2 | FT3 |
| First Lipid Component 2 | 51.87 wt % | 48.87 wt % | 47.87 wt % |
| Water | 9 wt % | 9 wt % | 9 wt % |
| Sugar | 20 wt % | 20 wt % | 20 wt % |
| Fructose syrup | 17 wt % | 20 wt % | 20 wt % |
| Emulsifier 1 | 0.4 wt % | 0.5 wt % | 0.5 wt % |
| Emulsifier 2 | 0.8 wt % | N/A | 1 wt % |
| Second Lipid Component 1 | N/A | N/A | N/A |
| Second Lipid Component 2 | N/A | 1 wt % | 1 wt % |
| Second Lipid Component 3 | N/A | 0.5 wt % | 0.5 wt % |
| Second Lipid Component 4 | 0.8 wt % | N/A | N/A |
| Antioxidant | 0.005 wt % | 0.005 wt % | 0.005 wt % |
| Flavor | 0.12 wt % | 0.12 wt % | 0.12 wt % |
| Beta-carotene | 0.0045 wt % | 0.0045 wt % | 0.0045 wt % |
| SFA Content of Lipid Phase | 51.4 wt % | 52.5 wt % | 52.2 wt % |
| C18:0 Content of Lipid Phase | 4.7 wt % | 5.4 wt % | 5.6 wt % |
| C22:0 Content of Lipid Phase | 0.1 wt % | 0.9 wt % | 1 wt % |
| Second Lipid Component Content of Lipid Composition | 0.80 wt % | 1.50 wt % | 1.50 wt % |
| Molar Amount of Second Lipid Component/Molar Amount of Lipid Phase | 2.06 mol % | 1.91 mol % | ~~1.93 mol %~~ 1.91 mol % |
| TFA Content of Lipid Phase | 1.1 wt % | 1.0 wt % | 1.0 wt % |
| Hardness of lipid composition at 5° C. by TA analysis | 932 g | 931 g | 838 g |
| Hardness of lipid composition at 25° C. by TA analysis | 129 g (Too soft) | 137 g (Too soft) | 132 g (Too soft) |

It can be seen from the above that the lipid composition is too soft (<200 g) at 25° C., if the content of the second lipid components is 1.5 wt % or lower, and/or the molar amount of the second lipid components accounts for less than 2.2 mol % of the total molar amount of the lipid phase (i.e., first and second lipid components and emulsifier(s)).

Example 4

In this example, the relationship between the content of the second lipid components and the textual properties of the lipid composition is further explored.

| | Batch | | | |
|---|---|---|---|---|
| Ingredient | GO1 | GO2 | GO3 | GO4 |
| First Lipid Component 1 | 56.87 wt % | 56.87 wt % | 54.37 wt % | 54.37 wt % |
| Water | 15 wt % | 15 wt % | 15 wt % | 15 wt % |
| Sugar | 24 wt % | 24 wt % | 24 wt % | 24 wt % |
| Fructose Syrup | N/A | N/A | N/A | N/A |
| Emulsifier 1 | 0.5 wt % | 0.5 wt % | 0.5 wt % | 0.5 wt % |
| Emulsifier 2 | N/A | N/A | N/A | N/A |
| Second Lipid Component 1 | 1 wt % | N/A | 1 wt % | N/A |
| Second Lipid Component 2 | N/A | 1 wt % | N/A | 1 wt % |
| Second Lipid Component 3 | N/A | N/A | N/A | N/A |
| Second Lipid Component 4 | 2.5 wt % | 2.5 wt % | 5 wt % | 5 wt % |
| Second Lipid Component 5 | N/A | N/A | N/A | N/A |
| Antioxidant | 0.005 wt % | 0.005 wt % | 0.005 wt % | 0.00 wt % |
| Flavor | 0.12 wt % | 0.12 wt % | 0.12 wt % | 0.12 wt % |
| Beta-carotene | 0.0045 wt % | 0.0045 wt % | 0.0045 wt % | 0.0045 wt % |
| SFA Content of Lipid Phase | 46.8 wt % | 47.1 wt % | 49.1 wt % | 49.6 wt % |
| C18:0 Content of Lipid Phase | 5.8 wt % | 5.9 wt % | 7.1 wt % | 7.4 wt % |
| C22:0 Content of Lipid Phase | 0.5 wt % | 0.8 wt % | 0.5 wt % | 0.8 wt % |
| Second Lipid Component Content of Lipid Composition | 3.50 wt % | 3.50 wt % | 6.00 wt % | 3.50 wt % |
| Molar Amount of Second Lipid Component/Molar Amount of Lipid Phase | 7.38 mol % | 6.85 mol % | 12.94 mol % | 12.45 mol % |
| TFA Content Of Lipid Phase | 1.2 wt % | 1.2 wt % | 1.1 wt % | 1.1 wt % |
| Hardness of Lipid Composition at 5° C. by TA Analysis | 1291 g | 1421 g | 1349 g | 1300 g |
| Hardness of Lipid Composition at 25° C. by TA Analysis | 284 g (Strong) | 287 g (Strong) | 391 g (Very strong) | 234 g (Strong) |

| | Batch | | | |
|---|---|---|---|---|
| Ingredient | GO5 | GO6 | GO7 | GO8 |
| First Lipid Component 1 | 49.87 wt % | 56.87 wt % | 54.37 wt % | 57.87 wt % |
| Water | 9 wt % | 15 wt % | 15 wt % | 15 wt % |
| Sugar | 20 wt % | 24 wt % | 24 wt % | 24 wt % |
| Fructose Syrup | 17% | N/A | N/A | N/A |
| Emulsifier 1 | 0.5 wt % | 0.5 wt % | 0.5 wt % | 0.5 wt % |
| Emulsifier 2 | N/A | N/A | N/A | N/A |
| Second Lipid Component 1 | 1 wt % | N/A | N/A | 1 wt % |
| Second Lipid Component 2 | N/A | 1 wt % | 1 wt % | N/A |

-continued

| | | | | |
|---|---|---|---|---|
| Second Lipid Component 3 | N/A | N/A | N/A | 1.5 wt % |
| Second Lipid Component 4 | 2.5 wt % | N/A | N/A | N/A |
| Second Lipid Component 5 | N/A | 2.5 wt % | 5 wt % | 0 |
| Antioxidant | 0.005 wt % | 0.005 wt % | 0.005 wt % | 0.005 wt % |
| Flavor | 0.12 wt % | 0.12 wt % | 0.12 wt % | 0.12 wt % |
| Beta-carotene | 0.0045 wt % | 0.0045 wt % | 0.0045 wt % | 0.0045 wt % |
| SFA Content of Lipid Phase | 46.5 wt % | 48.2 wt % | 50.8 wt % | 46.4 wt % |
| C18:0 Content of Lipid Phase | 5.9 wt % | 6.6 wt % | 8.2 wt % | 5.7 wt % |
| C22:0 Content of Lipid Phase | 0.5 wt % | 1.0 wt % | 1.0 wt % | 0.5 wt % |
| Second Lipid Component Content of Lipid Composition | 3.50 wt % | 3.50 wt % | 6.00 wt % | 2.50 wt % |
| Molar Amount of Second Lipid Component/Molar Amount of Lipid Phase | 8.33 mol % | 5.06 mol % | 9.07 mol % | 5.41 mol % |
| TFA Content Of Lipid Phase | 1.2 wt % | 1.1 wt % | 1.1 wt % | 1.1 wt % |
| Hardness of Lipid Composition at 5° C. by TA Analysis | 1252 g | 923 g | 1081 g | 1532 g |
| Hardness of Lipid Composition at 25° C. by TA Analysis | 253 g (Strong) | 212 g (Good) | 348 g (Strong) | 214 g (Good) |

| | Batch | | | |
|---|---|---|---|---|
| Ingredient | GT1 | GT2 | GT3 | GT4 |
| First Lipid Component 2 | 51.87 wt % | 50.37 wt % | 51.07 wt % | 48.87 wt % |
| Water | 9 wt % | 9 wt % | 9 wt % | 9 wt % |
| Sugar | 20 wt % | 20 wt % | 20 wt % | 20 wt % |
| Fructose syrup | 17 wt % | 17 wt % | 17 wt % | 20 wt % |
| Emulsifier 1 | 0.5 wt % | 0.5 wt % | 0.5 wt % | 0.5 wt % |
| Emulsifier 2 | N/A | N/A | N/A | N/A |
| Second Lipid Component 1 | 1.5 wt % | 1.5 wt % | 0.8 wt % | 1 wt % |
| Second Lipid Component 2 | N/A | N/A | N/A | N/A |
| Second Lipid Component 3 | N/A | N/A | N/A | 0.5 wt % |
| Second Lipid Component 4 | N/A | 1.5 wt % | 1.5 wt % | N/A |
| Antioxidant | 0.005 wt % | 0.005 wt % | 0.005 wt % | 0.005 wt % |
| Flavor | 0.12 wt % | 0.12 wt % | 0.12 wt % | 0.12 wt % |
| Beta-carotene | 0.0045 wt % | 0.0045 wt % | 0.0045 wt % | 0.0045 wt % |
| SFA Content of Lipid Phase | 52.2 wt % | 53.9 wt % | 53.0 wt % | 52.4 wt % |
| C18:0 Content of Lipid Phase | 5.1 wt % | 6.2 wt % | 5.8 wt % | 5.3 wt % |
| C22:0 Content of Lipid Phase | 0.7 wt % | 1.0 wt % | 0.6 wt % | 0.6 wt % |
| Second Lipid Component Content of Lipid Composition | 1.50 wt % | 3.00 wt % | 2.30 wt % | 1.50 wt % |
| Molar Amount of Second Lipid Component/Molar Amount of Lipid Phase | 2.70 mol % | 6.52 mol % | 5.28 mol % | 2.58 mol % |
| TFA Content of Lipid Phase | 1.12 wt % | 1.03 wt % | 1.06 wt % | 0.97 wt % |
| Hardness of Lipid Composition at 5° C. by TA Analysis | 1328 g | 1178 g | 1022 g | 1482 g |
| Hardness of Lipid Composition at 25° C. by TA Analysis | 293 g (Strong) | 350 g (Very strong) | 345 g (Very strong) | 224 g (Good) |

It can be seen from the above that if the content of second lipid components is from 1.5 wt % to 11 wt % and the molar amount of the second lipid components accounts for at least 2.2 mol % of the total molar amount of the lipid phase (i.e., first and second lipid components and emulsifier(s)), then the textual quality of the lipid composition can be significantly improved. Such a lipid composition has desirable firmness across the temperature range of 5-25° C. Specifically, not only that the lipid composition exhibits desirable firmness of from 800 g to 1800 g at 5° C., the lipid composition also has firmness as good as from 200 g to 500 g at 25° C. In other words, the lipid composition of the present invention exhibits better temperature tolerance as compared to the prior art.

Unless otherwise defined, all terms (including technical and scientific terms) used herein have the same meaning as commonly understood by one of ordinary skill in the art to which the aspects of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the disclosure has been described with reference to an exemplary aspect, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular aspect disclosed as the best mode contemplated for carrying out this disclosure, but that the disclosure will include all aspects falling within the scope of the appended claims.

All references specifically cited herein are hereby incorporated by reference in their entireties. However, the citation or incorporation of such a reference is not necessarily an admission as to its appropriateness, citability, and/or availability as prior art to/against the present invention.

CLAUSES

Clause 1. A lipid composition, comprising:
(a) from 30 wt % to 70 wt % a first lipid component, by weight of the lipid composition;
(b) from 10 wt % to 40 wt % a sweetening substance, by weight of the lipid composition;
(c) from 5 wt % to 20 wt % water, by weight of the lipid composition;
(d) from 0.1 wt % to 1.2 wt % an emulsifier, by weight of the lipid composition, wherein the emulsifier has a SFA content of less than 90 wt %; and
(e) from 1.5 wt % to 11 wt % a second lipid component, by weight of the lipid composition, wherein the second lipid component has a SFA content of at least 90 wt %, wherein fully saturated fatty acids with a carbon chain of more than 16 carbons account for at least 33.3 wt % of the SFA content of the second lipid component by weight, and wherein the molar amount of the second lipid component accounts for from 2.2 mol % to 15 mol % of the total molar amount of the first lipid component, the emulsifier and the second lipid component,
wherein the lipid composition has a SFA content of at least 40 wt %, wherein fully saturated fatty acids with a carbon chain of more than 16 carbons account for at least 12.5 wt % of the SFA of the lipid composition by weight,
wherein the lipid composition has a hardness of from 200 g to 500 g at 25° C. by texture analysis as measured using a 5 mm cylinder probe to penetrate 75% of original height of the lipid composition at 2 mm/s, and
wherein the lipid composition comprises less than 2% TFA.

Clause 2. The lipid composition according to clause 1, wherein the lipid composition has a SFA content of from 40 wt % to 60 wt %; or SFA content of from 43 wt % to 57 wt %; or SFA content of from 45 wt % to 55 wt %.

Clause 3. The lipid composition according to clause 1 or 2, wherein the lipid composition has a C18:0 content of from 4.5 wt % to 9 wt %; or C18:0 content of from 4.7 wt % to 8.5 wt %; or C18:0 content of from 5 wt % to 8.3 wt %.

Clause 4. The lipid composition according to any one of the preceding clauses, wherein the lipid composition has a C22:0 content of from 0.1 wt % to 1.5 wt %; or C22:0 content of from 0.3 wt % to 1.3 wt %; or C22:0 content of from 0.4 wt % to 1.1 wt %.

Clause 5. The lipid composition according to any one of the preceding clauses, wherein the lipid composition comprises at least 1 wt % fully saturated fatty acids with a carbon chain longer than 16 carbons derived from the second lipid component; or at least 1.5 wt % fully saturated fatty acids with a carbon chain longer than 16 carbons derived from the second lipid component; or at least 2 wt % fully saturated fatty acids with a carbon chain longer than 16 carbons derived from the second lipid component.

Clause 6. The lipid composition according to any one of the preceding clauses, wherein the second lipid component has a C18:0 content of from 30 wt % to 50 wt %; or C18:0 content of from 35 wt % to 45 wt %.

Clause 7. The lipid composition according to any one of the preceding clauses, wherein the second lipid component is from 1.5 wt % to 10 wt %; or from 1.5 wt % to 7 wt %, by weight of the lipid composition.

Clause 8. The lipid composition according to any one of the preceding clauses, where in the lipid composition has a hardness of from 800 g to 1800 g, or from 900 g to 1500 g at 5° C. by texture analysis as measured using a 5 mm cylinder probe to penetrate 75% of original height of the lipid composition at 2 mm/s.

Clause 9. The lipid composition according to any one of the preceding clauses, wherein the first lipid component is an oil selected from the group consisting of soy bean oil, palm olein, palm stearin, palm kernel oil and a combination thereof.

Clause 10. The lipid composition according to clause 9, wherein the oil is processed by a technique selected from the group consisting of fractionation, interestification, blending and a combination thereof.

Clause 11. The lipid composition according to any one of the preceding clauses, wherein the lipid composition further comprises an additive selected from the group consisting of an antioxidant, a nutrient enhancer, a flavoring substance, a preservative, a pigment and a combination thereof.

Clause 12. The lipid composition according to any one of the preceding clauses, wherein the molar amount of the second lipid component accounts for from 2.5 mol % to 13.5 mol % of the total molar amount of the first lipid component, the emulsifier and the second lipid component; or from 2.55 mol % to 13.2 mol % of the total molar amount of the first lipid component, the emulsifier and the second lipid component; or from 2.7 mol % to 13 mol % of the total molar amount of the first lipid component, the emulsifier and the second lipid component; or from 5.2 mol % to 12.95 mol % of the total molar amount of the first lipid component, the emulsifier and the second lipid component.

Clause 13. The lipid composition according to any one of the preceding clauses, wherein the lipid composition comprises no partially hydrogenated lipid.

Clause 14. A food product comprising a lipid composition according to any one of the preceding clauses.

Clause 15. A food product comprising the lipid composition of the present invention and at least one other nutrient, which is not a lipid or a lipid composition.

Clause 16. The food product according to clause 14 or 15, wherein the food product is a bakery product made from a laminated dough.

Clause 17. The food product according to clause 14 or 15, where in the bakery product is selected from the group consisting of a bread, a croissant, a puff pastry, a Danish pastry and a galette.

Clause 18. A process of making a lipid composition according to any one of clauses 1-13, comprising:
(A) mixing, by weight of the lipid composition:
(i) from 30 wt % to 70 wt % a first lipid component;
(ii) from 1.5 wt % to 11 wt % a second lipid component, wherein the second lipid component has a SFA content of at least 90 wt %, wherein fully saturated fatty acids with a carbon chain of more than 16 carbons account for at least 33.3 wt % of the SFA content of the second lipid component by weight, and wherein the molar amount of the second lipid component accounts for from 2.2 mol % to 15 mol % of the total molar amount of the first lipid component, the emulsifier and the second lipid component; and
(iii) from 0.1 wt % to 1.2 wt % an emulsifier, wherein the emulsifier has a SFA content of less than 90 wt %, to produce a lipid phase;
(B) mixing, by weight of the lipid composition,
(i) from 5 wt % to 20 wt % water; and
(ii) from 10 wt % to 40 wt % a sweetening substance, to produce an aqueous phase;
(C) mixing the lipid phase and the aqueous phase to produce a water-in-oil emulsion; and
(D) cooling the water-in-oil emulsion with a cooling apparatus to produce a crystallized emulsion, wherein the lipid composition has a SFA content of at least 40 wt %, and fully saturated fatty acids with a carbon chain of more than 16 carbons account for at least 12.5 wt % of the SFA content of the lipid composition by weight, wherein the lipid composition has a hardness of from 200 g to 500 g at 25° C. by texture analysis as measured using a 5 mm cylinder probe to penetrate 75% of original height of the lipid composition at 2 mm/s, and wherein the lipid composition comprises less than 2% TFA.

Clause 19. The process according to clause 18, further comprising adding a lipophilic additive to the lipid phase before mixing with the aqueous phase.

Clause 20. The process according to clause 18 or 19, further comprising adding a water-soluble additive to the aqueous phase before mixing with the lipid phase.

Clause 21. The process according to clause 19 or 20, wherein the additive is selected from the group consisting of an antioxidant, a nutrient enhancer, a flavoring substance, a preservative, a pigment and a combination thereof.

Clause 21. The process according to any one of clauses 18-21, further comprising subjecting the crystallized emulsion to one of more of the following steps:
(A) resting;
(B) extrusion; and
(C) tempering.

Clause 23. Use of the lipid composition of clauses 1-16 for improving a property of a food product by a method comprising adding the lipid composition to the food product Clause 24. The use of clause 23, wherein the property is selected from the group consisting of nutritional profile, texture, color, taste, aroma, appearance, and a combination thereof.

Clause 25. The use of clause 23 or 24, wherein the food product is selected from the group consisting of a bread, a croissant, a puff pastry, a Danish pastry and a galette.

Clause 26. The use of clause 23 or 24, wherein the lipid composition is added as a laminating fat.

Claus 27. A method of making a laminated dough, comprising folding the lipid composition according to any one of clauses 1-13 into a flour dough.

Clause 28. The method of clause 27, further comprising subjecting the flour dough incorporating the lipid composition to a process consisting of the group of rolling, folding, sheeting and a combination thereof.

The invention claimed is:
1. A lipid composition, comprising:
(a) from 30 wt % to 70 wt % a first lipid component, by weight of the lipid composition, the first lipid component having a saturated fatty acids (SFA) content of 35 wt % to 60 wt %;
(b) from 10 wt % to 40 wt % a sweetening substance, by weight of the lipid composition;
(c) from 5 wt % to 20 wt % water, by weight of the lipid composition;
(d) from 0.1 wt % to 1.2 wt % an emulsifier, by weight of the lipid composition, wherein the emulsifier has a SFA content of less than 90 wt %; and
(e) from 1.5 wt % to 11 wt % a second lipid component, by weight of the lipid composition, wherein the second lipid component has a SFA content of at least 90 wt %, wherein fully saturated fatty acids with a carbon chain of more than 16 carbons account for at least 33.3 wt % of the SFA content of the second lipid component by weight, and wherein the molar amount of the second lipid component accounts for from 2.2 mol % to 15 mol % of the total molar amount of the first lipid component, the emulsifier and the second lipid component, wherein the lipid composition has a SFA content of at least 40 wt %, wherein fully saturated fatty acids with a carbon chain of more than 16 carbons account for at least 12.5 wt % of the SFA of the lipid composition by weight, wherein the lipid composition has a hardness of from 200 g to 500 g at 25° C. by texture analysis as measured using a 5 mm cylinder probe to penetrate 75% of original height of the lipid composition at 2 mm/s, and wherein the lipid composition comprises less than 2 wt % trans fatty acids (TFA).

2. The lipid composition according to claim 1, wherein the lipid composition has:

(A) a SFA content of from 40 wt % to 60 wt %; and/or (B) a C18:0 content of from 4.5 wt % to 9 wt %; and/or (C) a C22:0 content of from 0.1 wt % to 1.5 wt %.

3. The lipid composition according to claim 1, wherein the lipid composition has a hardness of from 800 g to 1800 g, at 5° C. by texture analysis as measured using a 5 mm cylinder probe to penetrate 75% of original height of the lipid composition at 2 mm/s.

4. The lipid composition according to claim 1, wherein the lipid composition comprises:

(A) at least 1 wt % fully saturated fatty acids with a carbon chain longer than 16 carbons derived from the second lipid component; and/or (B) an additive selected from the group consisting of an antioxidant, a nutrient enhancer, a flavoring substance, a preservative, a pigment and a combination thereof; and/or (C) no partially hydrogenated lipid.

5. The lipid composition according to claim 1, wherein the second lipid component has:

(A) a C18:0 content of from 30 wt % to 50 wt %; and/or (B) a weight percentage of from 1.5 wt % to 10 wt %; and/or (C) a molar amount which accounts for from 2.5_mol % to 13.5 mol % of the total molar amount of the first lipid component, the emulsifier and the second lipid component.

6. The lipid composition according to claim 1, wherein the first lipid component is an oil selected from the group consisting of soy bean oil, palm olein, palm stearin, palm kernel oil and a combination thereof, wherein optionally the oil is processed by a technique selected from the group consisting of fractionation, interesterification, blending and a combination thereof.

7. A food product comprising a lipid composition according to claim 1.

8. The food product according to claim 7, wherein the food product is a bakery product made from a laminated dough.

9. The food product according to claim 7, wherein the food product is a bakery product selected from the group consisting of a bread, a croissant, a puff pastry, a Danish pastry and a galette.

10. The process according to claim 8, further comprising subjecting the crystallized emulsion to one of more of the following steps:

(A) resting;

(B) extrusion; and (C) tempering.

11. A process of making a lipid composition, comprising:

(A) mixing, by weight of the lipid composition, (i) from 30 wt % to 70 wt % a first lipid component having a saturated fatty acids (SFA) content of 35 wt % to 60 wt %;

(ii) from 1.5 wt % to 11 wt % a second lipid component, wherein the second lipid component has a SFA content of at least 90 wt %, wherein fully saturated fatty acids with a carbon chain of more than 16 carbons account for at least 33.3 wt % of the SFA content of the second lipid component by weight, and wherein the molar amount of the second lipid component accounts for from 2.2 mol % to 15 mol % of the total molar amount of the first lipid component, the emulsifier and the second lipid component; and (iii) from 0.1 wt % to 1.2 wt % an emulsifier, wherein the emulsifier has a SFA content of less than 90 wt, to produce a lipid phase;

(B) mixing water and a sweetening substance to produce an aqueous phase;

(C) mixing the lipid phase and the aqueous phase to produce a water-in-oil emulsion; and (D) cooling the water-in-oil emulsion with a cooling apparatus to produce a crystallized emulsion, wherein the lipid composition has a SFA content of at least 40 wt %, and fully saturated fatty acids with a carbon chain of more than 16 carbons account for at least 12.5 wt % of the SFA content of the lipid composition by weight, wherein the lipid composition has a hardness of from 200 g to 500 g at 25° C. by texture analysis as measured using a 5 mm cylinder probe to penetrate 75% of original height of the lipid composition at 2 mm/s, and wherein the lipid composition contains less than 2 wt % trans fatty acids (TFA) TFA.

12. The process according to claim 11, further comprising adding a lipophilic additive and/or a water-soluble additive to the lipid phase before mixing with the aqueous phase.

13. The process according to claim 12, wherein the lipophilic additive and/or water-soluble additive is selected from the group consisting of an antioxidant, a nutrient enhancer, a flavoring substance, a preservative, a pigment and a combination thereof.

14. A method for improving a property of a food product, the method comprising:

adding the lipid composition of claim 1 to the food product.

15. The method of claim 14, wherein:

(A) the property is selected from the group consisting of nutritional profile, texture, color, taste, aroma, appearance, and a combination thereof; and/or (B) the food product is selected from the group consisting of a bread, a croissant, a puff pastry, a Danish pastry and a galette; and/or (C) the lipid composition is added as a laminating fat.

16. A method of making a laminated dough, comprising folding the lipid composition according to claim 1 into a flour dough.

17. The method according to claim 16, further comprising subjecting the flour dough incorporating the lipid composition to a process selected from the group consisting of rolling, folding, sheeting and a combination thereof.

* * * * *